(No Model.) 2 Sheets—Sheet 2.
C. E. WRIGHT.
BAND SAW GUIDE.
No. 446,127. Patented Feb. 10, 1891.
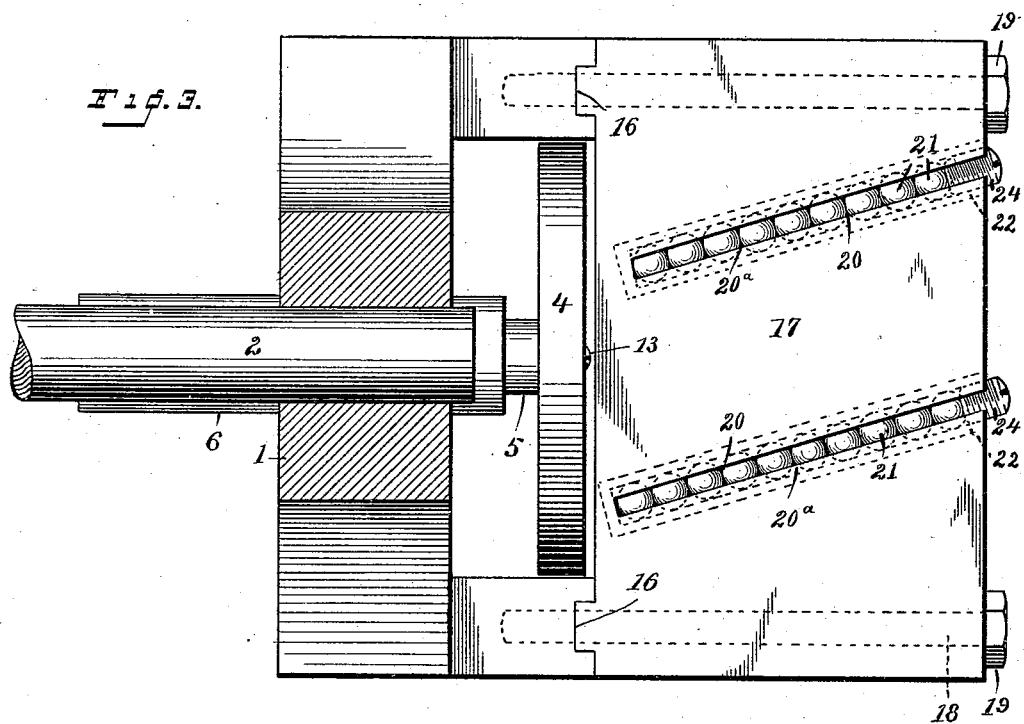
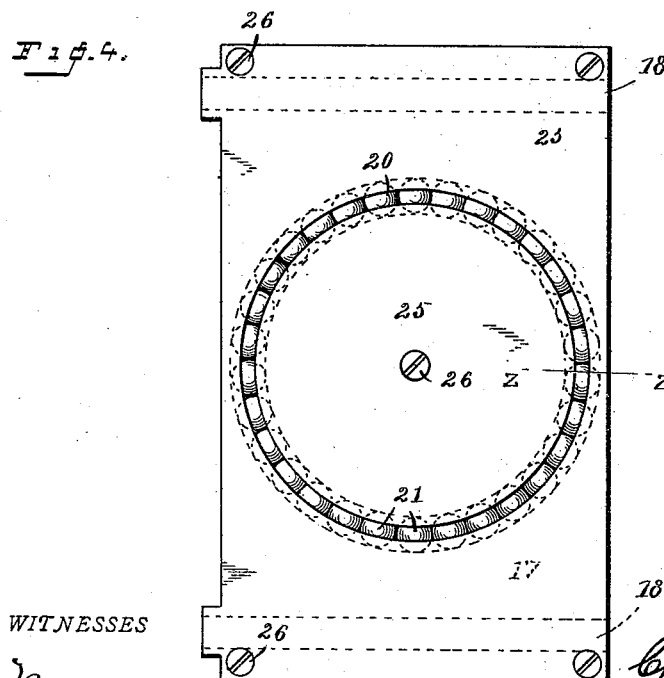
WITNESSES
C. M. Newman,
Arley J. Munson.
INVENTOR
Charles E. Wright
By A. M. Wooster
Atty.

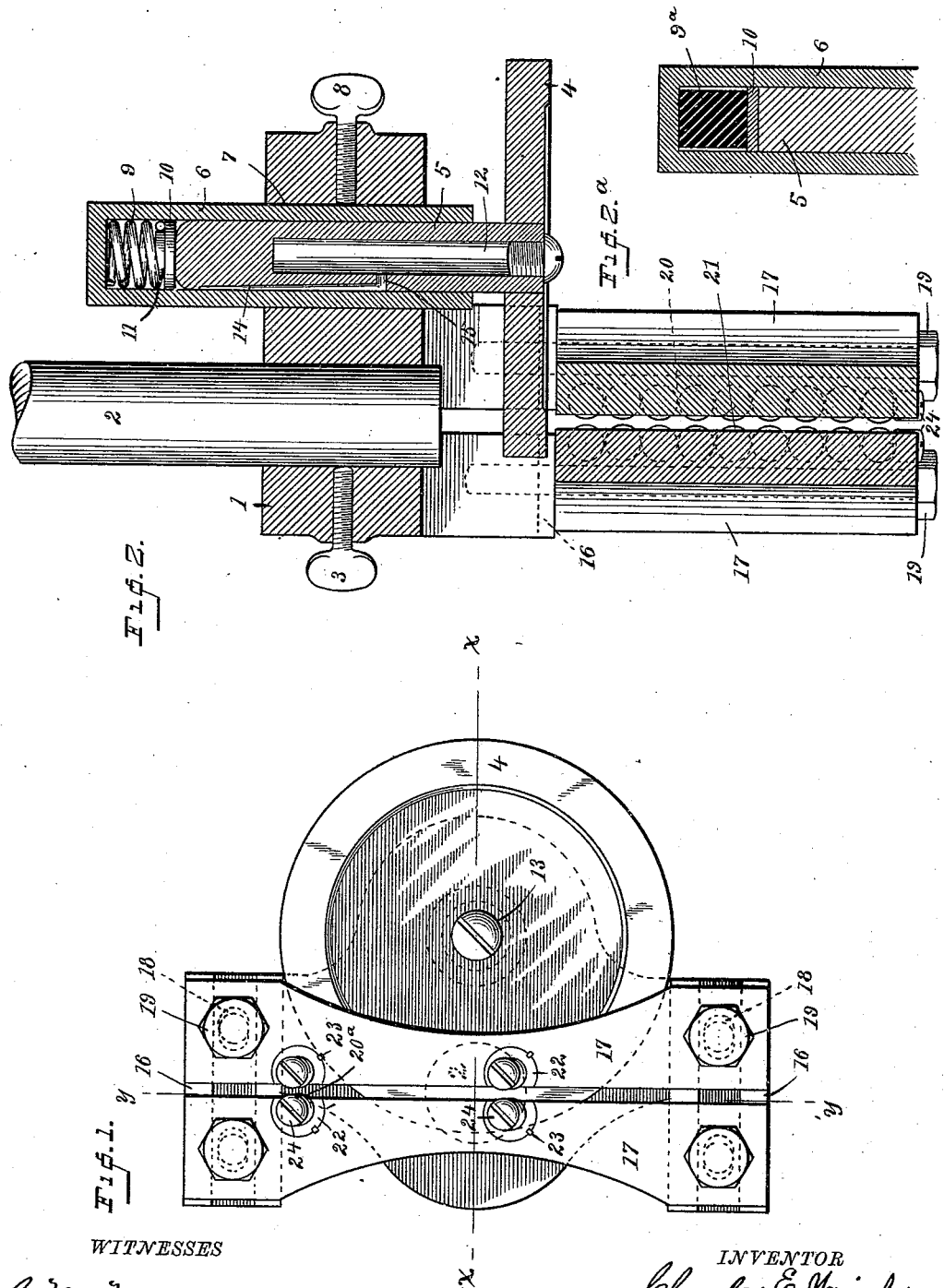

UNITED STATES PATENT OFFICE.

CHARLES E. WRIGHT, OF WATERBURY, CONNECTICUT.

BAND-SAW GUIDE.

SPECIFICATION forming part of Letters Patent No. 446,127, dated February 10, 1891.

Application filed September 29, 1890. Serial No. 366,446. (No model.)

*To all whom it may concern:*

Be it known that I, CHARLES E. WRIGHT, a citizen of the United States, residing at Waterbury, in the county of New Haven and State of Connecticut, have invented certain new and useful Improvements in Band-Saw Guides; and I do hereby declare the following to be a full, clear, and exact description of the invention, such as will enable others skilled in the art to which it appertains to make and use the same.

My invention relates to the class of band-saw guides described and claimed in Letters Patent No. 434,010, granted to me August 12, 1890—*i. e.*, saw-guides having rotating disks carried by contact of the back of the saw with the face thereof—and has for its object to improve their construction, more especially with reference to guides for large-sized saws. It is well understood by those familiar with the art that band-saws in use are carried by wheels the surfaces of which are covered with rubber or leather, a certain amount of friction being necessary to prevent the saw from slipping off. In using large-sized saws and in hard sawing with any-sized saw it follows necessarily that the back of the saw is pressed with considerable force against the disk of the guide, thereby causing great friction, there being danger, in exceptionally heavy work, of heating the disk and saw to such an extent as to endanger the temper of the saw. In order to obviate this objection, I provide that the spindle which carries the disk shall bear against a yielding support. In addition to this I provide the spindle with an oil-reservoir, which avoids the necessity of frequent oiling, and also provide ball-bearings instead of plates as side bearings for the saw.

In order to accomplish the desired result in the simplest manner possible, I have devised the novel construction of which the following description, in connection with the accompanying drawings, is a specification, numerals being used to denote the several parts.

Figure 1 is an elevation of my novel guide complete; Fig. 2, a horizontal section on the line $x$ $x$ in Fig. 1; Fig. 2$^a$, a detail view illustrating the use of a rubber block in lieu of a coil-spring in the yielding support; Fig. 3, a vertical section on the line $y$ $y$ in Fig. 1, looking toward the right, showing one arrangement of the balls which form the side bearings for the saw; Fig. 4, an elevation showing another form of arrangement of the balls in the side bearings, and Fig. 5 is a detail sectional view on the line $z$ $z$ in Fig. 4.

1 denotes the body of the guide, and 2 the arm by which it is supported, the body being provided with an opening to receive the arm and being locked in position thereon by a set-screw 3.

4 denotes the disk, 5 the spindle by which it is carried, and 6 a socket which receives the spindle. This socket passes through an opening 7 in the body, and is locked in the desired position by a set-screw 8.

In order to avoid the possibility of there being serious friction between the back of the saw and the disk, no matter how great may be the pressure against the saw, I provide a yielding support for the disk, which will permit the latter to move inward when pressure is applied, but will at the same time hold the disk against the back of the saw with sufficient pressure to insure the constant rotation of the disk. I preferably use for this purpose a coil-spring 9, which is placed between the inner end of the spindle and the base of the socket, although it is obvious that the spring might be placed outside of the socket, if preferred, or that a block of rubber might be substituted for the coil-spring, as indicated at 9$^a$ in Fig. 2$^a$. Between the spring and the inner end of the spindle I preferably place a disk or block 10. When a coil-spring is used, I preferably provide the disk or block with a hub 11 on its inner side, to which the spring is rigidly attached. In practice the hub is provided with a spiral groove, which receives the spring.

It will of course be apparent that in use it would be necessary to keep the bearing of the spindle in the socket well oiled. In order to accomplish this result and at the same time avoid the necessity for frequent oiling, I provide an oil-reservoir 12 within the spindle, which extends outward to the face of the disk and is closed by a screw 13. This reservoir extends inward some distance and intersects with an opening 15, leading from the periphery of the spindle, in addition to which I provide a tapering groove 14, which extends from the opening nearly to the inner end of the spindle. The inner end of the spindle is preferably rounded, as shown, and the disk or block against which it bears is made of chilled steel.

In my present guide the body is provided with grooves 16, which receive corresponding tongues on the side bearings 17. The side bearings are provided with slots 18, (see dotted lines, Fig. 1,) and are held in position by bolts 19, which pass through said slots and engage the body, thereby permitting convenient lateral adjustment of the side bearings, and also permitting the convenient removal of the side bearings and the substitution of wider or narrower ones, as may be required. When the guide is used in connection with wide heavy saws, I preferably use side bearings provided with sockets 20, adapted to receive anti-friction balls 21, the balls projecting outward through slots 20$^a$, so that the saw will bear against the balls only and not come in contact with the plates. The balls may be arranged in various ways—as, for instance, in straight downwardly and inwardly inclined sockets, as in Figs. 1 and 3, or in circular sockets, as in Figs. 4 and 5. When the sockets are arranged as in Figs. 1 and 3, I preferably place the balls in tubes 22. These tubes have slots upon their inner sides through which the balls project, and are locked in the sockets by keys 23 or in any suitable manner. The balls are held in the sockets by screws 24, which engage the outer ends. The screws may be readily tightened up or loosened for the purpose of adjustment. When the balls are arranged as in Figs. 4 and 5, half-sockets are formed in the side bearings, and the balls are retained in position by inner plates 25, held by screws 26. In order to provide for adjustment, I preferably place one or more thin plates 27 between the inner and outer plates.

It will of course be understood that the various details of construction may be greatly changed without departing from the principles of my invention.

I claim—

1. A saw-guide consisting, essentially, of a body, a disk capable of rotation by contact of the saw with the face thereof, and a yielding support for said disk which permits the latter to move inward when pressure is applied to the saw.

2. In a band-saw guide, the disk having a spindle and a socket to receive said spindle, in combination with a yielding support against which the spindle bears.

3. In a band-saw guide, the disk having a spindle, an adjustable socket to receive said spindle, and a yielding support at the base of the socket.

4. In a band-saw guide, the combination, with the disk having a spindle, of a socket to receive the spindle, and a yielding support consisting of a block and a coil-spring secured thereto and bearing against the base of the socket.

5. A disk for band-saw guides, having a spindle with a groove in its side and an oil-reservoir which is closed upon the face of the disk and leads into the groove on the side of the spindle.

6. A disk for saw-guides, having a spindle with a tapering groove in one side extending nearly to its inner end, and an oil-reservoir leading inward from the face of the disk, then to the periphery of the spindle, where it opens into the groove, and a screw in the face of the disk which closes the reservoir.

7. A side bearing for band-saw guides, having a socket 20, a slot leading into said socket, and a series of balls within the socket and extending outward through the slot, to serve as a bearing for the saw.

8. A side bearing for band-saw guides, having sockets 20, and slots leading into said sockets, and within the sockets slotted tubes, said tubes containing balls which extend through the slots and serve as bearings for the saw.

9. A side bearing for band-saw guides, having inwardly and downwardly inclined sockets, slots leading into said sockets, and within the sockets slotted tubes, series of balls within said tubes which project outward through the slots, and screws at the outer ends of the tubes which hold the balls in place.

In testimony whereof I affix my signature in presence of two witnesses.

CHARLES E. WRIGHT.

Witnesses:
JOHN F. DEVINE,
C. H. BRONSON.